(12) United States Patent
Shimada et al.

(10) Patent No.: US 6,727,628 B2
(45) Date of Patent: Apr. 27, 2004

(54) ROTOR STRUCTURE FOR PERMANENT-MAGNET MOTOR

(75) Inventors: Munekatsu Shimada, Tokyo (JP); Hideaki Ono, Kanagawa-ken (JP); Yuu Oowada, Kanagawa-ken (JP); Toshio Kikuchi, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/963,552

(22) Filed: Sep. 27, 2001

(65) Prior Publication Data

US 2002/0036440 A1 Mar. 28, 2002

(30) Foreign Application Priority Data

Sep. 28, 2000 (JP) ..................... P2000-296377

(51) Int. Cl.⁷ .................................................. H02K 1/00
(52) U.S. Cl. .................. 310/216; 310/217; 310/156.53; 310/156.61
(58) Field of Search ................................ 310/216–218, 310/156.12–156.15, 156.48, 156.49, 156.51–156.53, 156.55, 156.56, 156.59, 156.61

(56) References Cited

U.S. PATENT DOCUMENTS

| | | | |
|---|---|---|---|
| 3,671,787 A | * | 6/1972 | Herron .................. 310/154.11 |
| 4,160,182 A | * | 7/1979 | Mitsui ...................... 310/214 |
| 4,506,181 A | | 3/1985 | Jones et al. .................. 370/156 |
| 5,091,668 A | * | 2/1992 | Cuenot et al. ......... 310/156.61 |
| 5,338,996 A | * | 8/1994 | Yamamoto ................ 310/217 |
| 5,363,937 A | | 11/1994 | James ...................... 180/192 |
| 5,829,120 A | | 11/1998 | Uchida et al. ............. 29/598 |
| 5,894,182 A | * | 4/1999 | Saban et al. ............. 310/217 |
| 6,047,460 A | | 4/2000 | Nagate et al. ............... 29/598 |

FOREIGN PATENT DOCUMENTS

JP     2000/184638     6/2000

* cited by examiner

*Primary Examiner*—Dang Le
(74) *Attorney, Agent, or Firm*—McDermott, Will & Emery

(57) ABSTRACT

A rotor structure for a permanent-magnet motor is disclosed as including an annular laminated stack (2) of electromagnetic steel sheets incorporating magnets, annular end plates (1a, 1b) located at both ends of the annular laminated stack to hold the same, a cylindrical core buck (3) carrying thereon the annular laminated stack and the annular end plates, and a rotor shaft (5) integrally connected to the cylindrical core buck for rotating movement. The annular laminated stack has a plurality of first fixing portions (8a, 8a', 8a''; 8b, 8b', 8b''), and each of the annular end plates has a plurality of second fixing portions (7a, 7a', 7a''; 7b, 7b', 7b'') which are held in engagement with the first fixing portions of the annular laminated stack, with the annular end plates and the annular laminated stack being fixed to one another by caulking at the first and second fixing portions.

10 Claims, 3 Drawing Sheets

US 6,727,628 B2

ROTOR STRUCTURE FOR PERMANENT-MAGNET MOTOR

BACKGROUND OF THE INVENTION

This invention relates to rotor structures for three-phase synchronous permanent-magnet motor specifically used as motors or electric power generators and, more particularly, to a rotor structure, for a permanent-magnet motor, which has an increased strength to restrict deformation of the rotor structure caused at a high speed and which is specifically suited for an electric motor or an electric power generator of an electric vehicle.

A current permanent-magnet motor has achieved an extremely high operating performance to be suited for use in an automotive vehicle and has been already put to practical use. Also, it has been a usual practice to employ the permanent-magnet motor as an auxiliary propelling motor in a hybrid type electric vehicle. Thus, it is known that the permanent-magnet motor has an excellent operating characteristic among other electric motors. However, the permanent-magnet motor has many other remaining technical matters to be solved, and a still further development over the existing permanent-magnet motor is expected to solve the above technical matters to provide a further improved operating performance.

Typical examples of the above-mentioned technical matters involve a miniaturization of the motor for a reduced space, and a property of high speed rotation of the motor to realize one of various expedients to provide a high output performance. In a latter case where the motor rotates at an extremely high speed of more than 10,000 rpm, it is required for the rotor structure to have an extremely high strength.

FIG. 1 shows a typical example of a rotor structure for a permanent-magnet motor of a related art. The rotor structure is constructed having a pair of axially spaced annular end plates 1, 1, and an annular laminated stack 2 of electromagnetic sheets. The annular laminated stack 2 and the annular end plates 1, 1 are fixedly supported with a cylindrical core buck 3 of the cylindrical core buck 3, which is connected to a rotor shaft 5 via a connecting portion 6 for rotating movement therewith. As viewed in FIG. 2, the annular laminated stack 2 has plural permanent magnets 4, 4 located at circumferentially, equally spaced positions. While, in FIG. 2, only a single pole for the permanent magnets 4, 4 is shown, it is to be noted that the motor shown in FIGS. 1 and 2 is of the type having eight poles. The motor also has a magnet retaining structure wherein the magnet for one pole is divided into two pieces, with a central portion of one pole forming a bridge configuration to provide the magnet retaining structure having an increased strength to resist the centrifugal force.

SUMMARY OF THE INVENTION

In the permanent-magnet motor shown in FIG. 1, however, it is further required that the rotor structure should be improved to provide a further increased durability and strength in order to meet the need for the high output performance and the property of high speed rotation required in recent years. Also, it is required for the rotor structure to be manufactured in a simplified process to provide a structure having a high reliability without the use of an electronic beam welding technique that requires a high skill.

The present invention has been made to address the above technical matters and has an object to provide a rotor structure, for a permanent-magnet motor, which ensures an increased strength and durability even at high speed rotation and which has a structure enabled to be manufactured without the use of a highly skilled fabricating technique such as an electronic beam welding technique.

It is extremely difficult for the rotor structure to ensure a high reliability in restricting deformation, of the rotor structure caused at high speed rotation, with the use of the welding technique. Research and development have been deeply made with a view to finding out a new and unique joining structure of the rotor structure that can disenable the use of the welding technique. As a result, a new rotor structure is found wherein deformation of annular end plates of the rotor structure is restricted at the high speed rotation with the use of a unique mechanical fixing structure.

According to an aspect of the present invention, there is provided a rotor structure for a permanent-magnet motor, which comprises an annular laminated stack of electromagnetic steel sheets incorporating therein a permanent magnets, a pair of annular end plates between which the annular laminated stack is sandwiched, a cylindrical core buck having its outer circumferential periphery carrying thereon the annular laminated stack and the annular end plates, and a rotor shaft integrally connected to the cylindrical core buck to be rotatable therewith. Each outer end surface of the annular laminated stack has a plurality of first contoured fixing portions, and an inner surface of each of the annular end plates has a plurality of second contoured fixing portions. The annular laminated stack and the annular end plates are fixedly coupled to one another by caulking at the first and second fixing portions.

According to a second aspect of the present invention, there is provided a rotor structure for a permanent-magnet motor, which comprises an annular laminated stack of electromagnetic steel sheets incorporating therein permanent magnets, annular means holding the annular laminated stack at both sides thereof in a fixed place, cylindrical means carrying thereon the annular laminated stack and the annular means, and a rotor shaft integrally connected to the cylindrical means to be rotatable therewith. Each outer end surface of the annular laminated stack has a plurality of first contoured fixing portions, and the annular means has a plurality of second contoured fixing portions. The annular laminated stack and the annular means are fixedly coupled to one another by caulking at the first and second fixing portions.

BRIEF DESCRIPTION OF THE DRAWINGS

The invention, together with objects and advantages thereof, may best be understood by reference to the following description of the presently preferred embodiments together with the accompanying drawings, in which.

DETAILED DESCRIPTION OF THE PREFERRED EMBODIMENTS

A first preferred embodiment of a rotor structure for an electric rotary machine according to the present invention will be explained below with reference to FIG. 3.

Figure 1:
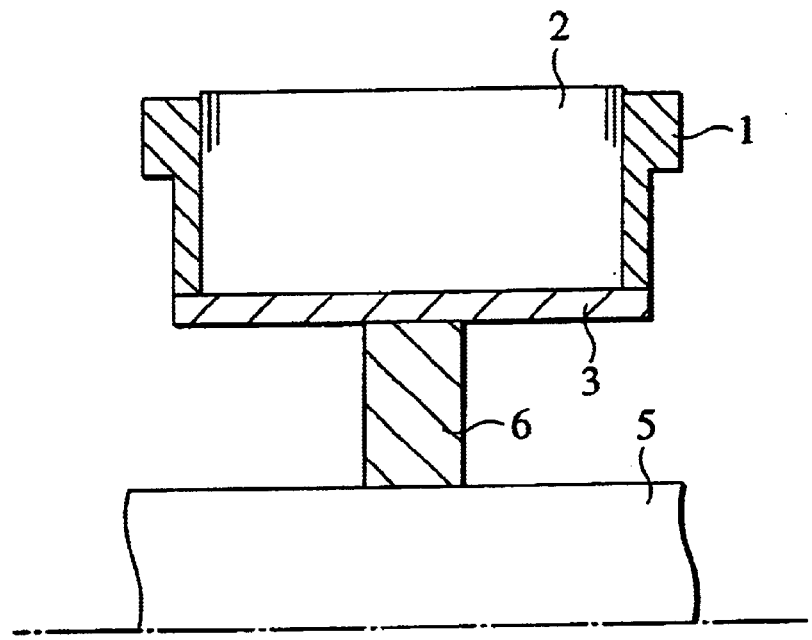
FIG. 1 is a schematic cross sectional view of a rotor structure for a permanent-magnet motor in a related art.
Figure 2:
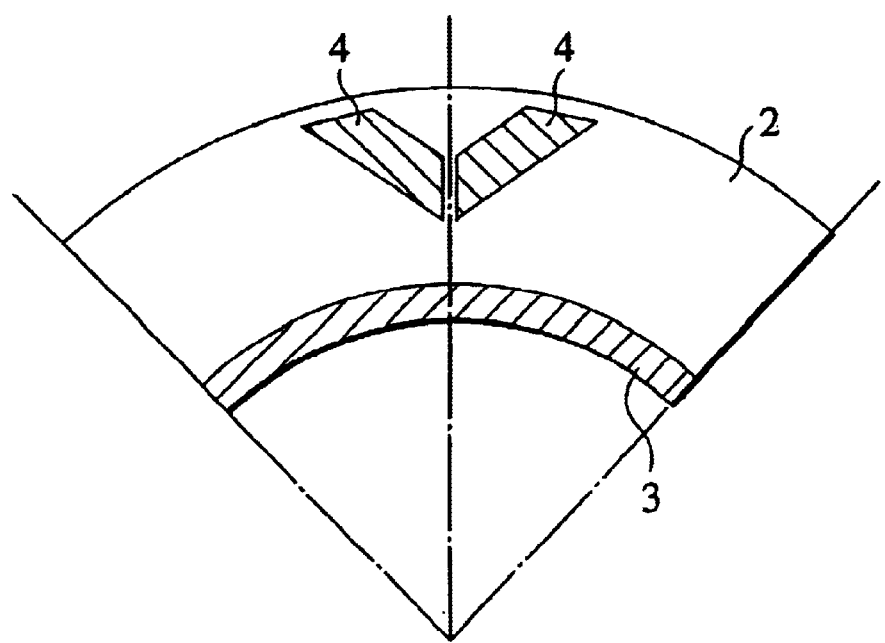
FIG. 2 is a schematic cross sectional view illustrating inner part of the rotor structure shown in FIG. 1.
Figure 3:
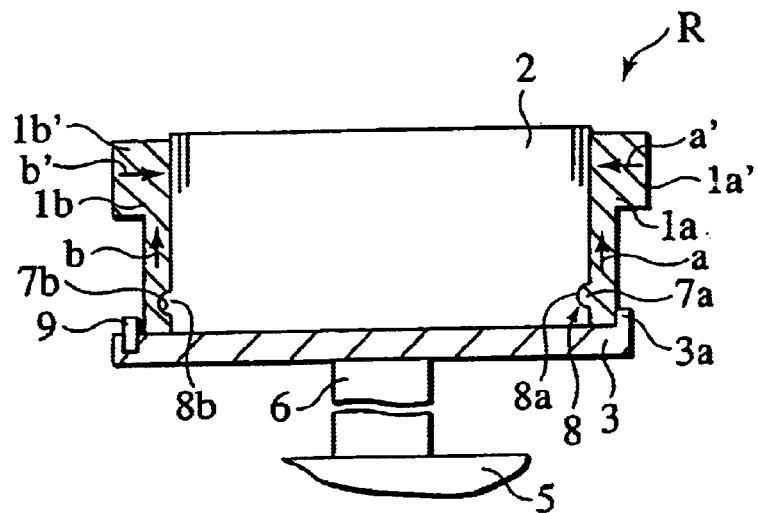
FIG. 3 is a cross sectional view of a rotor structure for a permanent-magnet motor of a first preferred embodiment of the present invention.

FIG. 3 is a cross sectional view illustrating an essential part of the rotor structure R. The rotor structure R includes a rotor shaft 5, a connecting section 6 extending radially outward from an outer circumferential periphery of the rotor shaft 5, a cylindrical core buck 3 integrally connected to the connecting portion 6, an annular laminated stack 2 of electromagnetic steel sheets, and first and second annular end plates 1a, 1b fixed to right and left end faces of the annular laminated stack 2 by caulking. The annular laminated stack 2 has a plurality of circumferentially equally spaced caulked portions 8. To this end, the annular laminated stack has the right end face formed with a plurality of axially concave recesses 8a and the left end face formed with a plurality of axially convex projections 8b, with the concave recesses 8a and the convex projections 8b serving as a first fixing means. The plural axial projections 7a of the annular end plate 1a and the axial recesses 7b of the annular end plate 1b form a second fixing means. In the rotor structure R shown in FIG. 3, a right distal end of the cylindrical core buck 3 is formed with an annular flange 3a which radially extends outward from the outer circumferential periphery of the cylindrical core buck 3 and which functions to hold the annular end plate 1a in a fixed plate. A left distal end portion of the cylindrical core buck 3 has a C-shaped ring 9 to hold the other annular end plate 1b in a fixed place. The right annular end plate 1a has an axially inwardly extending annular projection 7a which is fitted to the corresponding annular recess 8a of the annular laminated stack 2, and the left end plate 1b has an axially inwardly extending annular recess 7b which is fitted to the annular projection of the core stack 2.

Preferably, each of the annular end plates 1a, 1b is made of non-magnetic material. If the annular end plates 1a, 1b are made of magnetic material, the magnetic flux created in the core stack 2 by the plural permanent magnets supported in the annular laminated stack 2 is dissipated to the annular end plates 1a, 1b, with a resultant loss caused in an output power of an electromagnetic rotary machine. It is desired for the rotor structure R that the magnetic flux is oriented only toward a stator (not shown), which is located in the vicinity of an outer circumferential periphery of the annular laminated stack 2, to minimize the loss in the output power of the electromagnetic rotary machine. Also, if the annular end plates 1a, 1b are made of magnetic material, cutting scraps, which are formed during machining operation, tend to adhere to the annular end plates 1a, 1b, resulting in a degradation in the performance of the rotor structure. For all of these reasons, each of the annular end plates are preferably made of stainless steel, brass, copper or aluminum, etc. Among these metals, it is preferable for the annular end plates to be made of stainless steel represented by SUS 304 in a JIS clarification such as a stainless steel bar defined under JISG4303, a stainless steel plate or stainless steel belt formed by hot rolling under JISG4304 and a stainless steel plate or stainless steel belt formed under JISG4305. The SUS 304 material is widely used in various applications and is easy to be available in the market and provides a sufficient strength preferably suited for the material of the end plates.

In FIG. 3, the annular end plates 1a, 1b are exerted with centrifugal forces in directions as shown by arrows a, b, respectively. The annular end plates 1a, 1b have respective outward increased weight portions 1a', 1b' in which momentums are also imparted in arrows a', b', respectively, owing to their respective deviations in the center of gravities in the increased weight portions 1a', 1b'. In the illustrated embodiment of FIG. 3, each of the annular end plates 1a, 1b is designed to have a thickness of 4 mm to ensure a sufficient bending rigidity. The momentum forces are received with the core stack 2, and the annular radial protrusion 3a of the core cylindrical core buck 3 and the C-ring 9. The C-ring 9 is widely in use as a retaining piece which is readily available in the market and which is low in cost and is effective for ensuring a simplified assembling work for the end plate 1b. The C-ring is suitably made of hardened steel to provide a desired mechanical strength. The presence of the annular end plates 1a, 1b formed with the axial projections 7a and the axially indent recesses 7b, which are held in mating engagement with the annular laminated stack 2, allows a portion of the centrifugal force to be exerted in a radial direction to each of the end plates 1a, 1b to be received with the annular laminated stack 2.

In the illustrated embodiment of FIG. 3, further, although the annular end plate 1b has been shown and described as being stopped with the C-ring 9, the present invention is not limited to this type of retaining technique and the annular end plate 1b may be held in a fixed position by other retaining techniques such as a caulking step. The electromagnetic steel sheets of the annular laminated stack 2 are normally caulked in the same practice as performed in a usual caulking technique. When desired to fix the annular end plate 1b to the annular laminated stack 2, the annular end plate 1b is caulked with the annular laminated stack 2 and, for this reason, the second fixing means of each annular end plate is designed to be slightly larger than in size than the first fixing means of the annular laminated stack 2.

A rotor structure of the second preferred embodiment according to the present invention is described with reference to FIG. 4, with like parts bearing the same reference numerals as those used in FIG. 3 and a description of the same parts being omitted for the sake of simplicity.

Figure 4:
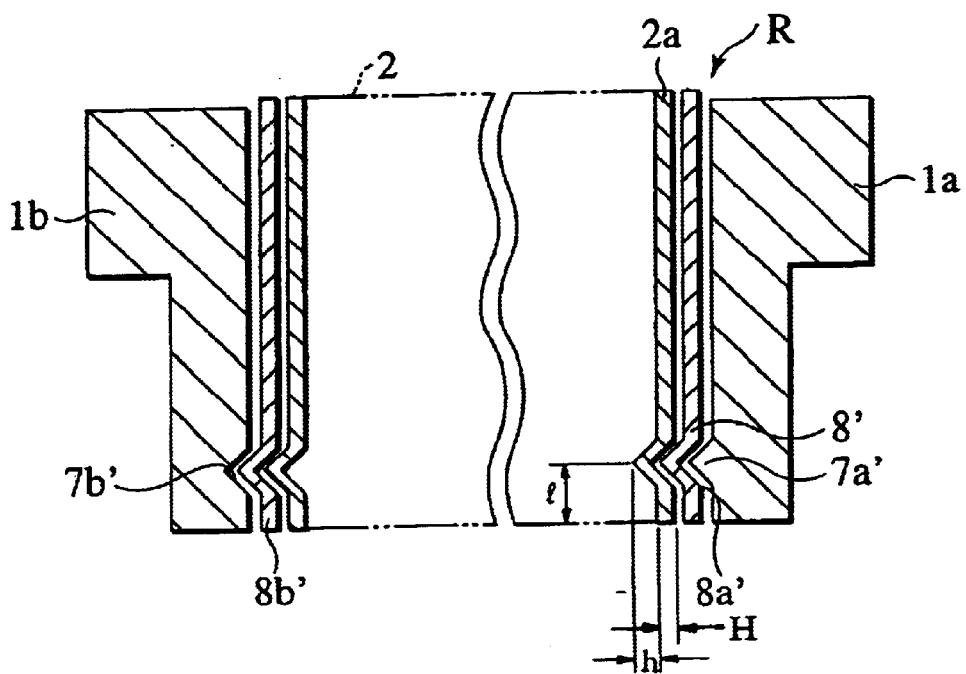
FIG. 4 is an enlarged cross sectional view of a rotor structure of a second preferred embodiment of the present invention.
Figure 6:
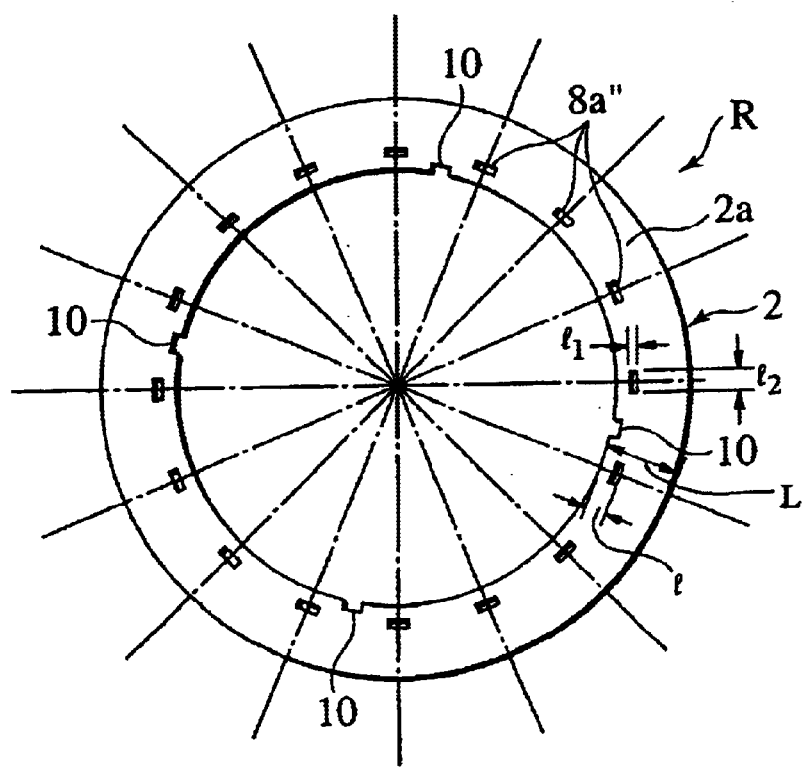
FIG. 6 is an enlarged side view of an annular laminated stack of electromagnetic sheets illustrating caulked portions of the same.

In the illustrated embodiment of FIG. 4, the annular end plates 1a, 1b are coupled to the annular laminated stack 2 by caulking at the second fixing means of the annular end plates 1a, 1b and the first fixing means of the annular laminated stack 2. The first fixing means of the annular laminated stack 2 is formed in a plurality of triangular-shaped profiles in an axial direction of the rotor shaft, and is formed in a plurality of rectangular-shaped profiles on each electromagnetic sheet plate that are located at circumferentially spaced locations (in detail as shown in FIG. 6). The presence of the caulked portions each formed in the triangular profile in the axial direction of the rotor shaft and the rectangular profile on each electromagnetic sheet plate renders the fabrication step to be easily implemented while ensuring a sufficient rigidity. Preferably, the rectangular profile may be designed to have a dimensional range composed of first and second dimensional elements such as a height or width ($l_1$ or $l_2$ as shown in FIG. 6) of more than 1 mm and the width or the height ($l_1$ or $l_2$ as shown in FIG. 6) of more than 2 mm. With such a dimensional range of the rectangular profile, the annular laminated stack 2 may be caulked without causing an increased number of caulking portions while preventing an imbalance in shape of the annular laminated stack 2 and ensuring the strength at the caulked portions. Each of the caulked portions may be preferably designed in the dimensional range to have the dimensional elements such as the height of approximately one to two times 1 the thickness of each steel plate in an axial direction of the rotor shaft. With such a dimensional range of each of the caulked portions, likewise, the annular laminated stack 2 may be caulked without causing the increased number of caulking portions while preventing the imbalance in shape of the annular laminated stack 2 and ensuring the strength at the caulked portions.

Figure 5:
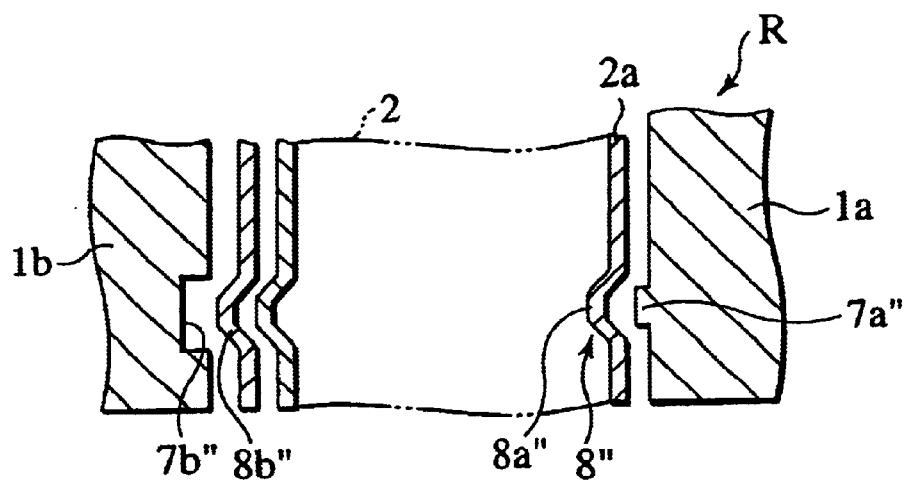
FIG. 5 is an enlarged cross sectional view of a third preferred embodiment of the present invention.

A rotor structure of a third preferred embodiment according to the present invention is described with reference to FIG. 5, with like parts bearing the same reference numerals as those used in FIG. 4. In the illustrated embodiment of FIG. 5, the annular laminated stack 2 has a plurality of caulked portions wherein each recess 8a" is formed to have a substantially trapezoid shape in an increased scale in cross section. The right annular end plate 1a has a plurality of circumferentially equally spaced projections 7a''', configured in a substantially rectangular shape in cross section, at which the annular end plate 1b is caulked to the right side of the annular laminated stack 2. Likewise, the left side face of the annular laminated stack 2 is formed with a plurality of circumferentially spaced axially and outwardly extending projections 8b" at which the annular end plate 1b is caulked to the left side of the annular laminated stack 2 at the circumferentially spaced axial projections 8b". With such a configuration of the rotor structure, it is possible for the annular laminated stack 2 and the annular end plates 1a, 1b to be coupled to one another in a tightly fixed relationship.

It will thus be seen that, in order to enhance the rigidity of the rotor structure by integrally assembling the annular laminated stack 2 of the electromagnetic steel sheets and the annular end plates to one another, the annular end plates may have the second fixing means formed in the substantially same shape and size as the first fixing means of the annular laminated stack 2.

FIG. 6 is a view for illustrating an example of a pattern of caulked portions formed in the electromagnetic steel sheet. In this case, the electromagnetic steel sheet is formed with sixteen caulked portions 8a". The number of caulked portions may involves a half of the above number of caulked portions, i.e., eight caulked portions, or a further half of the eight caulked portions, i.e., four caulked portions depending on various situations and, thus, the number of caulked portions may be preferably selected to have a suitable value in a range between 4 to 16 pieces. Also, the caulked portions may be formed at circumferentially, substantially, equally spaced positions. By forming the caulked portions in such equally spaced positions, a stress may be uniformly dispersed in the electromagnetic steel sheet to maintain a balance in strength. Selecting the number of caulked portions in the above range, it is possible for the strength, provided by the caulked portions, of the electromagnetic steel sheet to be highly improved to provide an improved operating performance of the motor, while enabling a capability in fabricating the rotor with an excellent strength without causing complicated fabricating steps.

Further, the caulked portions may be suitable located in a circumferential area distanced from an inner circumferential periphery of each electromagnetic steel sheet by 7 to 30% (7 (1/L)×100 30, in detail as shown in FIG. 4) a radial length of each electromagnetic steel sheet relative to an outer circumferential periphery thereof. By forming the caulked portions in such a circumferential area, the strength, provided by the caulked portions, of the electromagnetic steel sheet can be increased to minimize a deformation of the rotor, for thereby improving the operating performance of the motor. When forming the caulked portions outside the circumferential area in a range greater than 30%, the operating performance of the motor is adversely affected and, when forming the caulked portions inside the circumferential area in a range below 7%, the strength, provided by the caulked portions of the electromagnetic steel sheet tends to have a decreased value. In FIG. 6, further, although each of the caulked portions has been shown as an elongated shape in a circumferential direction, each caulked portion may extend in the elongated shape in the radial direction of the electromagnetic steel sheet or the electromagnetic steel sheet may have caulked portions extending in mixed orientations.

Also, the annular laminated stack 2 of the electromagnetic steel sheets has a plurality of cutouts 10 which serve as respective swivel stops and which serve to transmit a torque, acting on the annular laminated stack, to the cylindrical core buck. In the illustrated example, the stack of the electromagnetic steel sheets per se has the indents and the cylindrical core buck has the associated plural protrusions. Of course, such a combination may be reversed in structure.

In the illustrated embodiments discussed above, correction of rotational balance of the rotor structure is an essential work to be done for allowing the rotor shaft to rotate in a stabilized fashion by taking a weight balance of a rotational body, i.e., the rotor structure. To achieve this end, it is desired for each of the annular end plates to have an excessive marginal annular portion to be shaped to provide the weight balance.

As discussed above, in the illustrated embodiments of the present invention, a permanent-magnet motor is constructed essentially of a permanent magnet, which serves as a source of generating magnetic flux forming a power source, with an increase in the number of the permanent magnets resulting in an increased power output of the magnet type motor. In this event, the presence of a body of the laminated steel plates, which incorporate plural permanent magnets, allows the motor to provide a further increased power output. However, the steel plates should be formed of the electromagnetic steel sheet. The use of the electromagnetic steel sheets, each of which has both side surfaces are electrically insulated, is effective for restricting electric current to be generated in the electromagnetic steel sheets through which magnetic flux passes during rotation of the rotor structure, thereby lowering loss in the power output.

Further, the presence of the rotor structure, wherein the annular laminated stack of the electromagnetic steel sheets are sandwiched between the annular end plates and fitted on the cylindrical core buck, provides a sufficient rigidity to avoid deformation of the rotor structure during operation of the motor. These component elements constitute essential parts which can not be missed in the rotor of an internal magnet rotor type motor. The connecting portion, which interconnects the cylindrical core buck and the rotor shaft to one another, serves to provide a role to fix the desired component part to the rotor shaft.

In addition, the presence of a mechanical fixing technique, wherein the annular end plates are coupled to the annular laminated stack of the electromagnetic steel sheets which are caulked with the concave or convex portions, renders an assembling process to be simplified to provide an ease of quality control such as rigidity. Since, in this instance, each of the annular end plates has the convex projection or the concave recess each of which is held in mating engagement with the corresponding contoured caulked portion of the annular laminated stack of electromagnetic steel sheets, the annular end plates are enabled to be readily positioned relative to the core stack in a simplified fashion during fixing assembly. Also, the presence of the caulked portion in the annular laminated stack renders the assembling work efficiency to be improved while ensuring an increased rigidity.

Furthermore, in accordance with the rotor structure of the present invention, the use of the specific configuration, wherein a part of the centrifugal force generated in each annular end plate is received in the core stack of the laminated electromagnetic steel sheets, renders the rotor structure to realize the motor which is enabled to safely rotate at an extremely high speed reaching to a ten thousand and several hundred revolutions per minute, i.e., at a speed nearly equal to 20,000 rpm, even with the use of the annular end plates which are made of stainless steel "SUS304" classified under JIS (Japanese Industrial Standard) with less mechanical rigidity. Another advantage is found in that it is possible to enhance a reliability in the mechanical strength at the maximum speed of the motor. With no welding technique employed in the rotor structure of the present invention, it is possible to reduce the assembling work time as well as the investment costs for those welding machines.

The entire content of a Japanese Application No. P2000-296377 with a filing date of Sep. 28, 2000 is herein incorporated by reference.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A rotor structure for a permanent-magnet motor, comprising:
   an annular laminated stack of electromagnetic steel sheets incorporating therein permanent magnets;
   a pair of annular end plates between which the annular laminated stack is sandwiched;
   a cylindrical core buck having its outer circumferential periphery carrying thereon the annular laminated stack and the annular end plates; and
   a rotor shaft integrally connected to the cylindrical core buck to be rotatable therewith, wherein
      each outer end surface of the annular laminated stack has a plurality of first fixing portions formed in one of substantially triangular and trapezoidal-shapes in an axial direction to the rotor shaft, and an inner surface of each of the annular end plates has a plurality of second fixing portions formed in one of substantially triangular and trapezoidal-shapes in the axial direction to the rotor shaft,
      the first fixing portions of each outer end surface of the annular laminated stack are engaged with the first fixing portions of adjoining outer end surface of the annular laminated stack, and
      the annular laminated stack and the annular end plates are fixedly coupled to one another by caulking at the plurality of first and second fixing portions.

2. The rotor structure according to claim 1, wherein the annular laminated stack and the annular end plates are held on the cylindrical core buck and fixed thereto by a C-ring fitted thereto.

3. The rotor structure according to claim 1, wherein the annular end plates and the annular laminated stack are fixed to the cylindrical core buck by caulking.

4. The rotor structure according to claim 1, wherein each of the annular end plates is made of non-magnetic material.

5. The rotor structure according to claim 1, wherein each of the annular end plates is made of stainless steel.

6. The rotor structure according to claim 1, wherein the first fixing portions of the annular laminated stack are located in a circumferential area distanced from an inner circumferential periphery of each electromagnetic steel sheet by from 7 to 30% a radial length of each electromagnetic steel sheet relative to an out circumferential periphery thereof and at circumferentially, equally spaced positions.

7. The rotor structure according to claim 6, wherein each of the first fixing portions of the annular laminated stack is formed in a rectangular shape on each electromagnetic sheet plate which has a side of more than 1 mm and another side of more than 2 mm, and wherein each of the first fixing portions has a height in the axial direction to the rotor shaft, equal to one to two times the thickness of each electromagnetic steel plate.

8. The rotor structure according to claim 1, wherein each of the second fixing portions of the annular end plate has substantially the same size as that of each of the first fixing portion of the annular laminated stack.

9. The rotor structure according to claim 1, wherein each of the annular end plates has an excessive marginal portion for enabling a rotating balance of the rotor.

10. A rotor structure for a magnet motor, comprising:
   an annular laminated stack of electromagnetic steel plates incorporating therein permanent magnets;
   annular means holding the annular laminated stack at both sides thereof in a fixed place;
   cylindrical means carrying thereon the annular laminated stack and the annular means; and
   a rotor shaft integrally connected to the cylindrical means to be rotatable therewith, wherein each outer end surface of the annular laminated stack has a plurality of first fixing portions formed in one of substantially triangular and trapezoidal-shapes in an axial direction to the rotor shaft, and the annular means has a plurality of second fixing portions formed in one of substantially triangular and trapezoidal-shapes,
   the first fixing portions of each outer end surface of the annular laminated stack are engaged with the first fixing portions of the adjoining outer end surface of the annular laminated stack, and
   the annular laminated stack and the annular means are fixedly coupled to one another by caulking at the plurality of first and second fixing portions.

* * * * *